(12) United States Patent
Haynes, Jr. et al.

(10) Patent No.: US 8,108,882 B1
(45) Date of Patent: Jan. 31, 2012

(54) METHOD AND APPARATUS FOR INTERFACING AN OPERATING SYSTEM WITH A NETWORK INTERFACE DEVICE

(75) Inventors: John E. Haynes, Jr., South Weymouth, MA (US); Adam J. Hutchinson, Templeton, MA (US)

(73) Assignee: EMC Corporation, Hopkinton, MA (US)

( * ) Notice: Subject to any disclaimer, the term of this patent is extended or adjusted under 35 U.S.C. 154(b) by 1274 days.

(21) Appl. No.: 11/529,123

(22) Filed: Sep. 28, 2006

(51) Int. Cl.
*G06F 13/10* (2006.01)

(52) U.S. Cl. .......................... 719/321; 719/326; 709/230

(58) Field of Classification Search .................... 719/326
See application file for complete search history.

(56) References Cited

U.S. PATENT DOCUMENTS

| | | | | |
|---|---|---|---|---|
| 6,470,397 B1 * | 10/2002 | Shah et al. | ..................... | 709/250 |
| 6,968,307 B1 | 11/2005 | Chrysanthakopoulos | ...... | 703/27 |
| 2005/0021680 A1 * | 1/2005 | Ekis et al. | ..................... | 709/219 |
| 2005/0195833 A1 | 9/2005 | Chiang et al. | ............ | 370/395.52 |
| 2005/0281280 A1 * | 12/2005 | Zur et al. | ...................... | 370/419 |
| 2006/0235977 A1 * | 10/2006 | Wunderlich et al. | .......... | 709/227 |

OTHER PUBLICATIONS

Raffo, Dave, *Byte and Switch—Information Lifecycle Management (ILM)—Microsoft Accelerates iSCSI Support*, (May 23, 2006).

* cited by examiner

*Primary Examiner* — S. Sough
*Assistant Examiner* — Syed Roni
(74) *Attorney, Agent, or Firm* — BainwoodHuang (57) ABSTRACT

A processing unit is configured to establish a driver relationship between a network interface driver and a network interface device, the network interface device being configured to carry out multiple functions through the operating system. The processing unit is also configured to associate the network interface driver with a first driver of the operating system to provide a first function pathway between the network interface device and the first driver of the operating system through the network interface driver. The processing unit is also configured to associate the network interface driver with a second driver of the operating system to provide a second function pathway between the network interface device and the second driver of the operating system through the network interface driver. The first function pathway and the second function pathway allow the network interface device to carry out the multiple functions through the operating system.

16 Claims, 5 Drawing Sheets

METHOD AND APPARATUS FOR INTERFACING AN OPERATING SYSTEM WITH A NETWORK INTERFACE DEVICE

BACKGROUND

The expansion of information service and data processing industries has resulted in a need for computer systems to manage and store large amounts of data. Data storage system developers have responded to these types of data storage requirements by integrating large capacity data storage systems into networks called storage area networks (SANs). A SAN is a collection of networked data storage devices and storage processors that operate to serve data stored in the data storage devices to end-user or host devices. When exchanging data read/write requests with the SAN, the host device can utilize various types of communications protocols based upon the configuration of the SAN. For example, certain SANs (e.g., Internet Protocol (IP)-SANs) are configured to utilize the Internet Small Computer System Interface (iSCSI) protocol for exchanging SCSI commands and data over an Internet Protocol (IP) network. The iSCSI protocol allows the host device to access the storage devices over the IP network using block-based input/output (I/O) commands.

During operation, the storage processors of the IP-based SANs typically receive both iSCSI (e.g., block-based) traffic as well as TCP/IP (e.g., non-iSCSI) network traffic from host devices. Conventionally, within the IP-based SAN, iSCSI traffic constitutes a relatively high-volume of traffic while non-iSCSI (e.g., TCP/IP) traffic constitutes a relatively low volume of traffic supporting standard network services such as ping, trace route, iSNS, etc. In order to accelerate network input/output (I/O) within the IP-based SAN, the storage processors can be configured to process both the iSCSI traffic and the TCP/IP network traffic running the same proprietary driver. For example, conventional storage processors include TCP/IP offload engine (TOE) devices, such as iSCSI controller model ISP4010 distributed by QLogic Corporation, Aliso Viejo, Calif., to accelerate both iSCSI and the TCP/IP network traffic through the storage processors running the same device driver.

Figure 1:
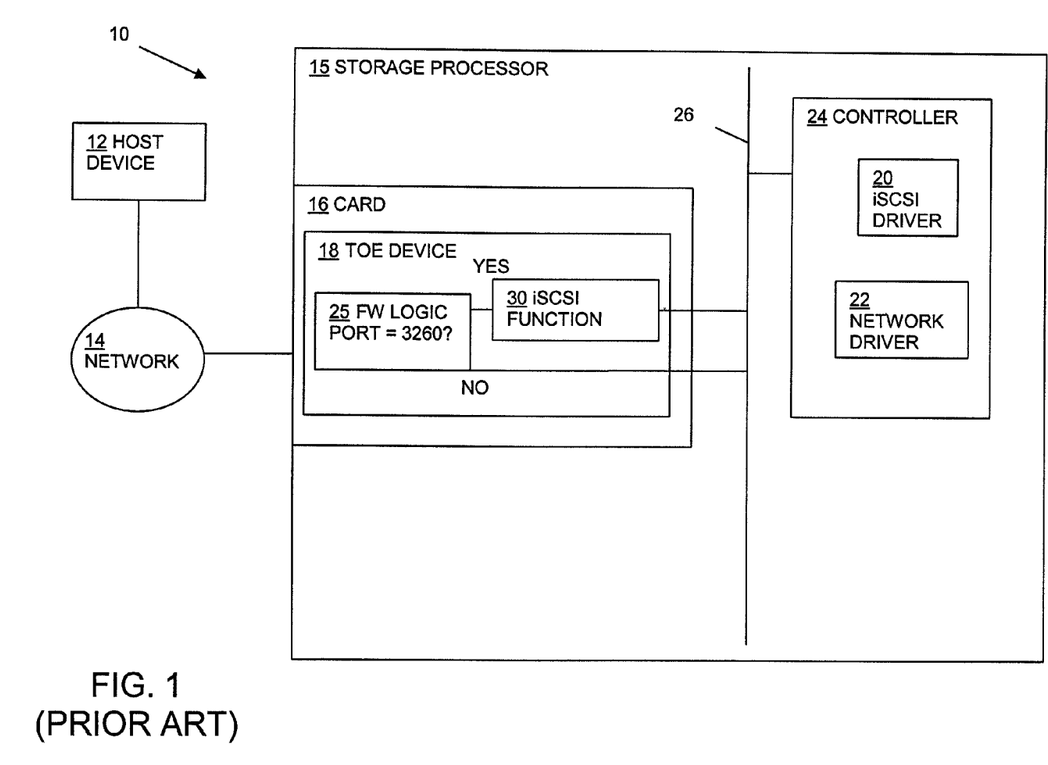
FIG. 1 illustrates a conventional storage system.

In certain IP-based SANs, the TOE devices are configured, in firmware, to differentiate between iSCSI and non-iSCSI traffic and direct the traffic to the appropriate driver for processing. For example, FIG. 1 illustrates a conventional IP-based SAN 10 that includes a host device 12 in communication with a storage processor 15 via network 14. The storage processor 15 includes a TOE device 18 coupled to a controller 24 by a PCI bus 26. Once connected to the PCI bus 26, during a boot-up procedure, the TOE device 18 presents two functions to the controller 24 over the PCI bus 26: an iSCSI communications function and a non-ISCI communications function. As such, the TOE device 18 notifies the controller 24 that it is capable of handling both iSCSI and non-iSCSI traffic. The controller 24, such as a microprocessor, runs an operating system that includes a proprietary iSCSI driver 20 and a standard network driver 22 (e.g., the Microsoft NDIS network driver), capable of processing iSCSI and non-iSCSI traffic, respectively, as received from the TOE device 18.

During operation, when the TOE device 18 receives a communications packet from the host device 12. In order to differentiate between iSCSI and non-iSCSI traffic, firmware logic 25 of the TOE device 18 examines a destination port number associated with the packet to determine the appropriate driver 20, 22 to be used in processing the communications packet. For example, in the case where the destination port number is equal to a preset value, such as a port value of 3260, the firmware logic 25 detects that the communications packet is part of an iSCSI communication from the host device 12. As a result, the firmware logic 25 passes the packet to an iSCSI processing function 30 associated with the TOE device 18 which, in turn, passes the iSCSI packet to the iSCSI driver 20, via the bus 26, for processing. In the case where the destination port number is not equal to a preset value, such as a port value of 3260, the firmware logic 25 detects that the communications packet is part of a non-iSCSI communication from the host device 12. As a result, the firmware logic 25 passes the packet, via the bus 26, to the network driver 22, for processing by standard operating system network services.

SUMMARY

The TOE device 18, as described above, includes firmware logic 25 that examines the destination port number associated with each packet received from the host device 12 in order to detect whether the packet is part of an iSCSI or non-iSCSI communication. Such examination of each packet can add latency into a communications session between the host device 12 and the storage processor 15. Additionally, during a boot-up procedure, the TOE device 18 presents two separate functions, an iSCSI communications function and a non-ISCI communications function, to the controller 24 on the PCI bus 26. The TOE device 18, therefore, requires two separate PCI bus addresses for identification of the functions on the PCI bus 26.

By contrast to conventional storage processor, embodiments of the present invention relate to a method and apparatus for interfacing an operating system with a network interface device. A storage processor includes a processing unit connected to the network interface device by a bus. The network interface device is configured to carry out multiple network functions, such as the exchange of iSCSI and TCP/IP commands between a host device and the processing unit. During initialization, the processing unit receives a network function identifier from the network interface device through a bus address on the bus. The network function identifier indicates, to the processing unit, the ability for the network interface device to perform multiple sub-functions. For example, the network function identifier can indicate to the processing unit that the network interface device is configured to direct network communications (e.g., a single network function), both iSCSI (e.g., a first network sub-function) and TCP/IP (e.g., a second network sub-function), through the operating system running on the processing unit. Based upon the network function identifier, the processing unit, through a specialized network interface driver, establishes separate pathways between the network interface device and the operating system drivers associated with each sub-function. By creating separate pathways, the processing unit provides the network interface device with access to multiple operating system drivers through a single bus address. Additionally, in one arrangement, for communication packets received from the network interface device, the network interface driver is configured to detect the appropriate pathway and driver used to process the communications packet. The network interface driver therefore offloads the driver selection process from the network interface device, thereby reducing latency in communications sessions carried between a host device and the storage processor.

One embodiment relates to a method for interfacing an operating system with a network interface device. The method includes establishing a driver relationship between a network interface driver and the network interface device, the network interface device being configured to carry out multiple functions through the operating system. The method also includes associating the network interface driver with a first driver of the operating system to provide a first function pathway between the network interface device and the first driver of the operating system through the network interface driver. The method also includes associating the network interface driver with a second driver of the operating system to provide a second function pathway between the network interface device and the second driver of the operating system through the network interface driver. The first function pathway and the second function pathway allow the network interface device to carry out the multiple functions through the operating system.

One embodiment relates to a storage processor having a network interface device configured to receive a communications signal from a host device via a network, a bus coupled to the network interface device, and a processing unit coupled to the bus. The processing unit is configured to establish a driver relationship between a network interface driver of an operating system executed by the processing unit and the network interface device, the network interface device being configured to carry out multiple functions through the operating system. The processing unit is also configured to associate the network interface driver with a first driver of the operating system to provide a first function pathway between the network interface device and the first driver of the operating system through the network interface driver. The processing unit is also configured to associate the network interface driver with a second driver of the operating system to provide a second function pathway between the network interface device and the second driver of the operating system through the network interface driver. The first function pathway and the second function pathway allow the network interface device to carry out the multiple functions through the operating system.

One embodiment relates to a method for processing a communications signal. The method includes receiving a communication signal from a TOE device, the communications signal directed toward a network address associated with the TOE device. The method includes comparing a processing indicator of the communications signal with a threshold value. The method also includes directing the communication signal to (i) a first driver when the processing indicator has a first value relative to the threshold value, and (ii) to a second driver when the processing indicator has a second value relative to the threshold value.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention relate to a method and apparatus for interfacing an operating system with a network interface device. A storage processor includes a processing unit connected to the network interface device by a bus. The network interface device is configured to carry out multiple network functions, such as the exchange of iSCSI and TCP/IP commands between a host device and the processing unit. During initialization, the processing unit receives a network function identifier from the network interface device through a bus address on the bus. The network function identifier indicates, to the processing unit, the ability for the network interface device to perform multiple sub-functions. For example, the network function identifier can indicate to the processing unit that the network interface device is configured to direct network communications (e.g., a single network function), both iSCSI (e.g., a first network sub-function) and TCP/IP (e.g., a second network sub-function), through the operating system running on the processing unit. Based upon the network function identifier, the processing unit, through a specialized network interface driver, establishes separate pathways between the network interface device and the operating system drivers associated with each sub-function. By creating separate pathways, the processing unit provides the network interface device with access to multiple operating system drivers through a single bus address. Additionally, in one arrangement, for communication packets received from the network interface device, the network interface driver is configured to detect the appropriate pathway and driver used to process the communications packet. The network interface driver therefore offloads a decision making process from the network interface device to reduce latency in a communications session between a host device and the storage processor.

Figure 2:
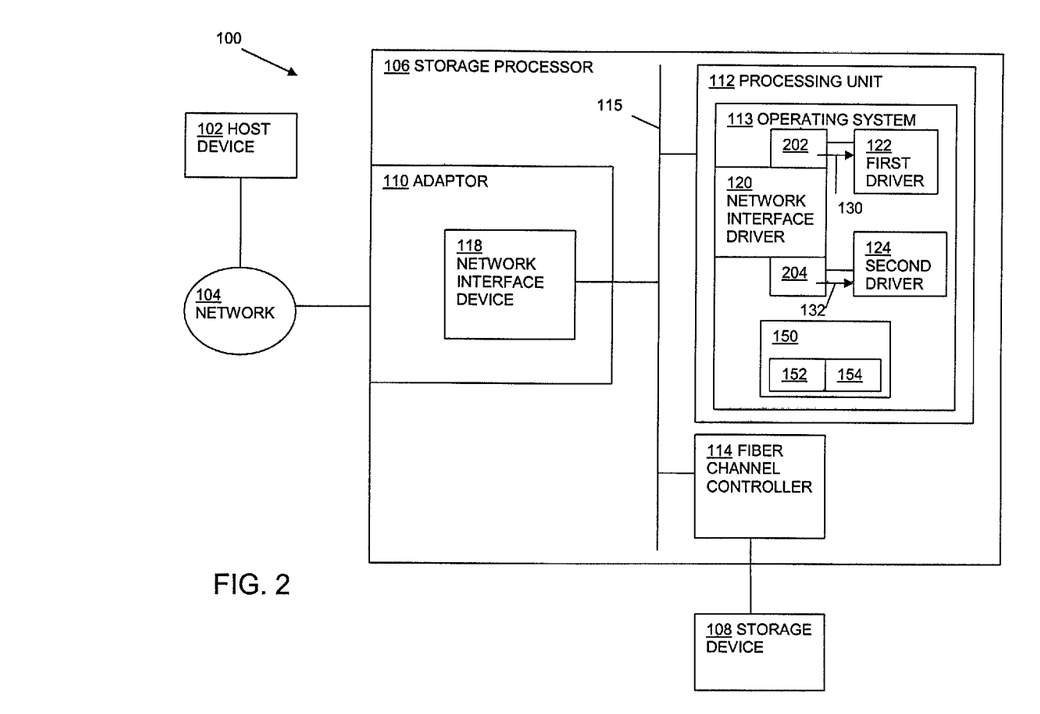
FIG. 2 illustrates an example storage system having a processor executing a network interface driver to interface an operating system running on the processor with a network interface device.

FIG. 2 illustrates an example embodiment of a storage area network 100 having a host device 102, a network 104, a storage processor 106, and one or more storage devices 108 such as disk drives or tape drives.

The host device 102, such as a personal computer or laptop computer, communicates with the storage processor 106 through the network 104, such as a Transmission Control Protocol/Internet Protocol (TCP/IP) configured local area network (LAN) or wide area network (WAN). The host device 102 is configured to exchange data read/write requests with the storage device 108, through the network 104 and storage processor 106, to access data from or store data to the storage device 108. For example, the host can exchange block-based communications, such as Internet Small Computer System Interface (iSCSI) commands, with the storage processor 106 over the network 104 to read data from or write data to the storage device 108. The host device 102 is also configured to exchange non block-based communications with the storage processor 106. In one arrangement, the host device 102 is configured to exchange TCP/IP communications (e.g., packets) with the storage processor 106 to access certain network applications provided by the storage processor. For example, the host device 102 transmits TCP/IP communications to the storage processor to access ping, trace route, Simple Network Management Protocol (SNMP), or Internet Storage Name Service (iSNS) applications.

The storage processor 106 is configured to process both block-based communications, such as iSCSI communications, and non block-based communications, such as TCP/IP network communications, received from the host device 102. For example, the storage processor 106 is configured with a single IP address to identify itself on the network 104. In use, the storage processor 106 receives all network 104 communications destined for its IP address, both block-based and non block-based communications, directed from the host device 102. In one arrangement, the storage processor 106 includes an adaptor 110 and a processing unit 112 interconnected via a bus 115, such as a peripheral component interconnect (PCI) bus. As will be described in detail below, the adaptor 110 and processing unit 112 are configured to process the communications received from the host device 102. The storage processor 106 also includes a fiber channel controller 114 coupled to the bus 115, the fiber channel controller 114 being configured to provide data transfer between the host device 102 and the storage device 108.

The adaptor 110, such as a host bus adaptor, provides an interface between the host device 102 and the storage device 108. For example, the adaptor 110 is operable to receive both block-based and non block-based communications from the host device 102 as destined for the IP address of the storage processor 106. The adaptor 110 includes a network interface device 118, such as a TOE device, configured to support block-based and non block-based communications, thereby allowing the host device 102 to communicate with the storage processor 106 using either iSCSI or TCP/IP communication protocols. In one arrangement, as will be described below, the network interface device 118 performs certain processing functions on block-based communications received by the storage processor 106 in order to accelerate processing of I/O received by the storage processor 106.

The processing unit 112, such as a central processing unit or microprocessor, is configured to run an operating system 113, such as Microsoft Windows, which includes one or more drivers, such as first and second drivers 122, 124. A driver is an application configured to process commands associated with the control of a particular device. For example, with respect to FIG. 2, the operating system 113 of the processing unit 112 includes a network driver interface 120 that is configured to facilitate processing of either block-based or non block-based communications exchanged between the host device 102 and the storage processor 106. The network interface driver 120 directs communications signals received from the network interface device 118 to either the first driver 122 or the second driver 124 of the operating system 113. For example, the operating system 113 can include a block-based communication driver, such as an iSCSI driver, as the first driver 122 and a TCP/IP, non block-based communications (i.e., network) driver, such as an NDIS driver, as the second driver 124. The iSCSI driver 122 is operable to process iSCSI communications received from the network interface device 118 for eventual transmission to the fiber channel controller 114. For example, as indicated in the arrangement shown in FIG. 5, the iSCSI driver 122 processes the iSCSI communications and passes the iSCSI communication to a FLARE application 212 (e.g., an application used in CLARiiON networked storage systems as distributed by EMC Corporation, Hopkinton, Mass.). The FLARE application 212 then passes the iSCSI communication to a fiber channel driver 214 for eventual transmission to the fiber channel controller 114. The NDIS driver 124 is operable to process network communications, such as TCP/IP communications, received from the network interface device 118. For example, also as indicated in the arrangement shown in FIG. 5, the NDIS driver 124 passes the TCP/IP network communication to an IP layer, 22, a TCP layer 224, and a sockets layer 226 for processing by a network application 228, such as SNMP or iSNS applications.

Figure 3:
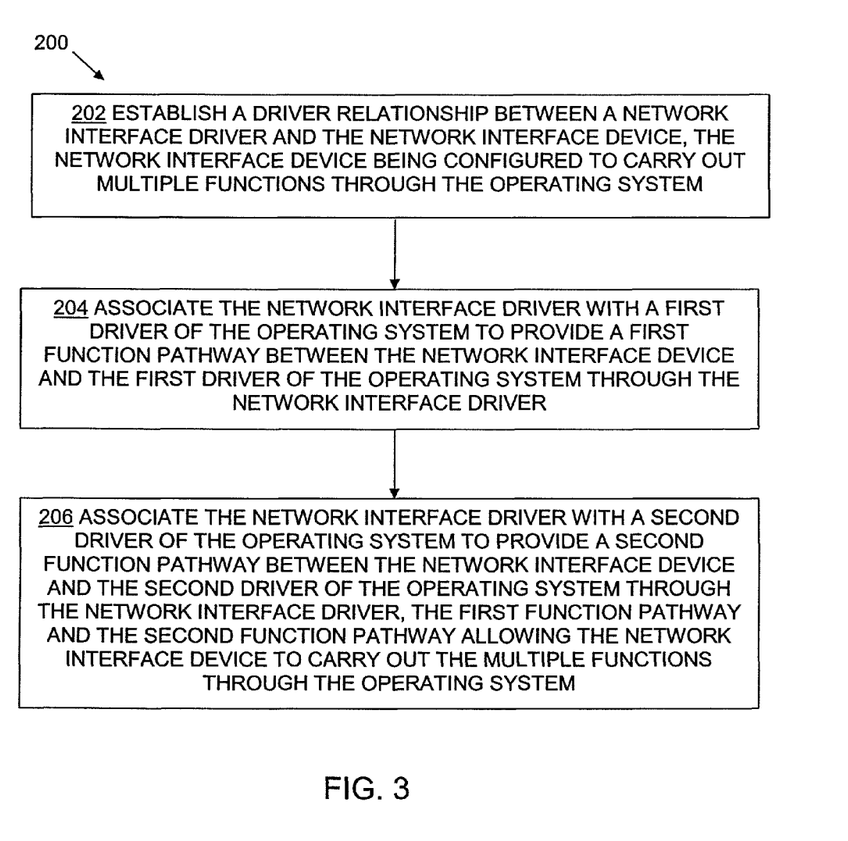
FIG. 3 is a flowchart illustrating an example method for interfacing an operating system with a network interface device.

FIG. 3 is a flowchart 200 that illustrates the steps performed by the processing unit 112 when interfacing the operating system 113, running on the processing unit 112, with the network interface device 118.

In step 202, the processing unit 112 establishes a driver relationship between the network interface driver 120 and the network interface device 118, the network interface device 118 being configured to carry out multiple functions through the operating system 113. In one arrangement, when establishing the driver relationship, the processing unit 112 detects the presence of the network interface device 118 on the bus 115 and maps the network interface device 118 to the network interface driver 120.

For example, with reference to FIG. 2, when the storage processor 106 undergoes a boot-up process, the processing unit 112 scans the bus 115 to detect the presence or connection of devices on the bus 115. In one arrangement, during a scanning procedure, the processing unit 112 identifies the connection of devices to the bus 115 by iterating through a series of known bus addresses (e.g., each bus address including a bus number, device number and function number) and transmitting a discovery signal to each known bus address. When the processing unit 112 transmits the discovery signal to the bus address of the network interface device 118, in response to receiving the discovery signal, the network interface device 118 transmits a single network function identifier to the processing unit 112. In one arrangement, the network function identifier includes a vendor identification number used to identify the manufacturer of the network interface device 118 and a device identification number used to identify the type of input/output function associated with the network interface device 118.

In the present example, the network function identifier indicates to the processing unit that the network interface device 118 is configured to perform a single network function where the single network function 150 is composed of multiple sub-functions. For example, the network function identifier indicates to the processing unit 112 that the network interface device 118 is configured to direct network communications (e.g., a single network function) 150, both block-based communications, such as iSCSI communications (e.g., a first network sub-function) 152 and non block-based communications, such as TCP/IP communications (e.g., a second network sub-function) 154, through the operating system 113. Based upon the network function identifier, to establish the driver relationship, the processing unit 112 maps the network interface device 118 to the network interface driver 120 such that all network communications from the network interface device 118, whether block-based communications or non block-based communications, are received by the network interface driver 120.

Returning to FIG. 3, in step 204, the processing unit 112 associates the network interface driver 120 with a first driver 122 of the operating system 113 to provide a first function pathway 130 between the network interface device 118 and the first driver 122 of the operating system 113 through the network interface driver 120. Furthermore in step 206, the processing unit 112 associates the network interface driver 120 with a second driver 124 of the operating system 113 to provide a second function pathway 132 between the network interface device 118 and the second driver 124 of the operating system 113 through the network interface driver 120. The first function pathway 130 and the second function pathway 132 allow the network interface device 118 to carry out multiple functions through the operating system 113.

While the processing unit 112 can associate the network interface driver with first and second drivers 122, 124 of the operating system 113 in a variety of ways, in one arrangement, the processing unit 112 establishes virtual device objects that provide separate paths through the network interface driver 120 to the drivers 122, 124. For example, as indicated above, upon discovery, the network interface device 118 provides an indication to the processing unit 112 of its configuration to direct iSCSI communications and TCP/IP communications through the operating system 113. In order to properly process and provide direction of such communications through the operating system 113, the processing unit 112 utilizes a particular driver corresponding to the type of communications received: either an iSCSI driver 122 for processing iSCSI communications or a network (e.g., NDIS) driver 124 for processing TCP/IP communications. In one arrangement, to establish the first and second function pathways 130, 132 through the network interface driver 120, the processing unit 112 creates virtual device objects associated with the network interface driver 120. For example, as shown in FIG. 2, the processing unit 112 creates a first virtual device object 202 and a second virtual device object 204. The first and second virtual device objects 202, 204 are virtual machine applications that run in the processing unit's operating system 113 and represent device calls to the operating system's drivers. For example, the first virtual device object 202 represents a call made by the network interface driver 120 to the iSCSI driver 122 when the network interface device 118 transmits iSCSI communications to the network interface driver 120 and the second virtual device object 204 represents a call made by the network interface driver 120 to the network (e.g., NDIS) driver 124 when the network interface device 118 transmits non-iSCSI (e.g., TCP/IP) communications to the network interface driver 120. By establishing separate function pathways 130, 132, the network interface driver 120 provides a multifunctional device, such as the network interface device 118, with access to distinct drivers of an operating system 113 through a single bus address on the bus 115.

Figure 4:
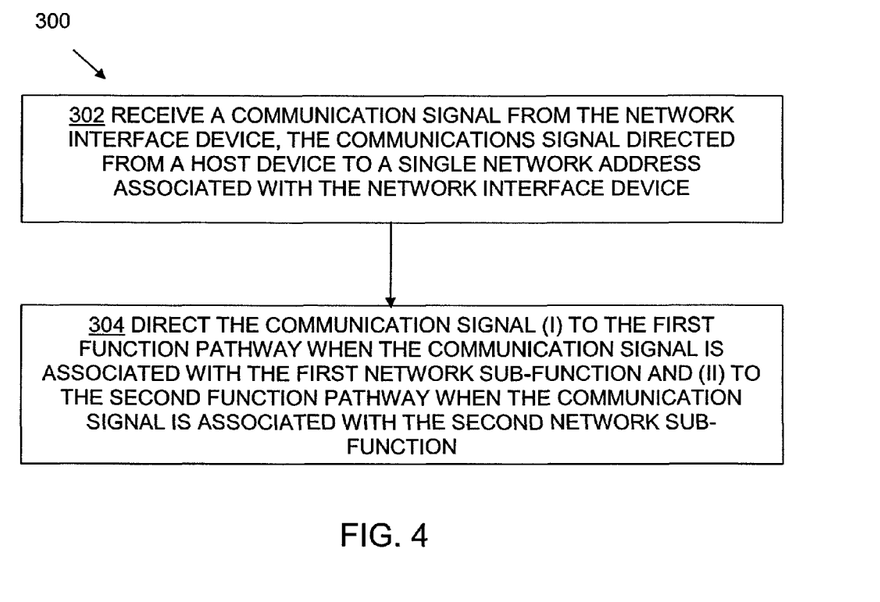
FIG. 4 is a flowchart illustrating an example method that allows the network interface device to carry out multiple functions through the operating system.

As indicated above once the processing unit 112 has provided the first and second function pathways 130, 132 between the network interface device 118 and the first and second drivers 122, 124, respectively, the first and second function pathways 130, 132 allow the network interface device 118 to carry out multiple functions through the operating system 113. FIG. 4 is a flowchart 300 illustrating a procedure performed by the processing unit 112 that allows the network interface device 118 to utilize one more drivers of the operating system 113.

In step 302 the processing unit 112 receives a communication signal from the network interface device 118, the communications signal directed from a host device 102 to a single network address associated with the network interface device 118. For example, to establish a communications session with the storage processor 106, the host device 102 initiates a handshaking procedure by transmitting an IP packet, such as a SYN to the IP address associated with the storage processor 106. The network interface device 118, in turn, sends the IP packet to the processing unit 112 for further processing.

In step 304, the processing unit 112 directs the communication signal (i) to the first function pathway 130 when the communication signal is associated with the first network sub-function and (ii) to the second function pathway 132 when the communication signal is associated with the second network sub-function. For example, in order to select an appropriate function pathway 130, 132 and driver 122, 124 for processing the packet, the processing unit 112 first associates the IP packet with a particular communications functionality (e.g., either an iSCSI based communication or a non-iSCSI, TCP/IP based communication). In one arrangement, in order to make the selection, the processing unit 112 examines a port identifier associated with the IP packet. Typically, IP packet headers include source and destination IP addresses and source and destination port identifiers. In the present example, the processing unit 112 compares the destination port identifier of the IP packet with a threshold port value to select the appropriate function pathway 130, 132 for processing of the IP packet.

Figure 5:
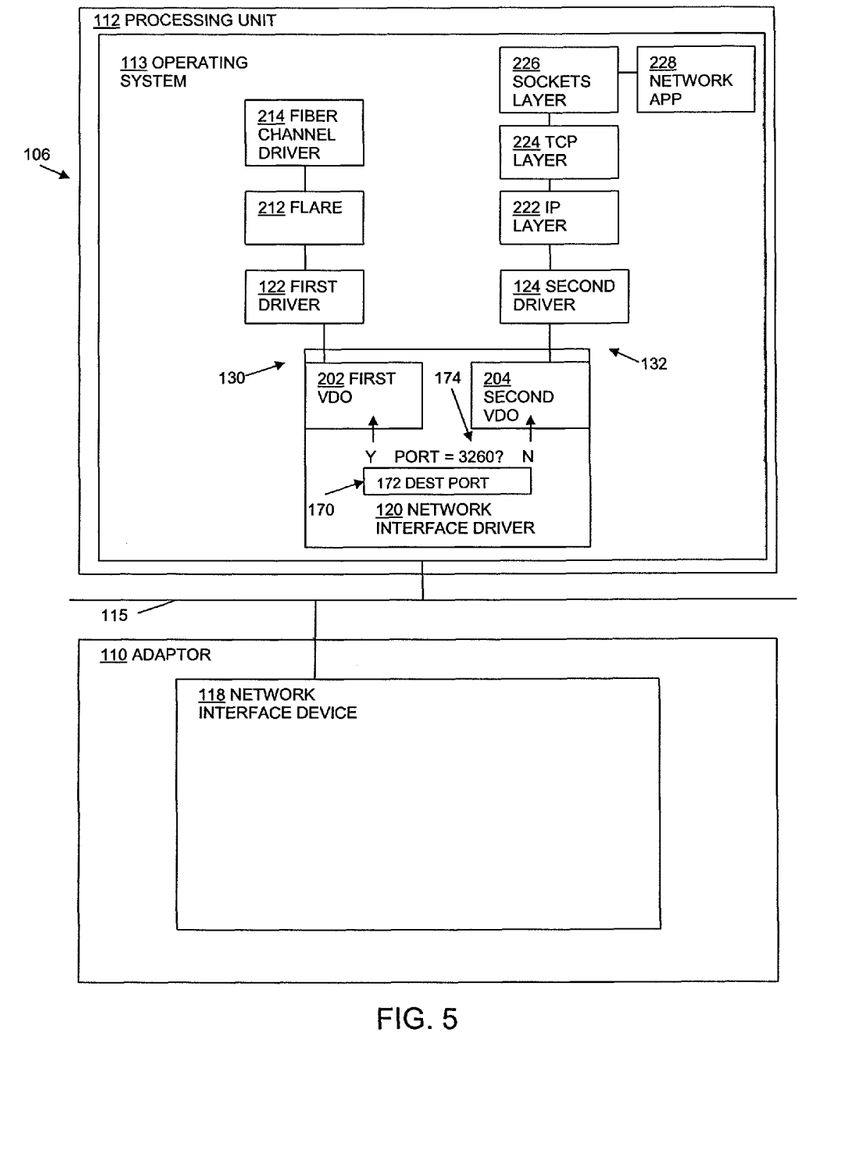
FIG. 5 illustrates an example of communication signals passed between the network interface driver and the network interface device of FIG. 2.

For example, with reference to FIG. 5, the network interface driver 120 receives an IP packet 170 from the network interface device 118 where the IP packet 170 includes a processing identifier, such as a destination port identifier 172. The network interface driver 120 compares the destination port identifier 172 with threshold port value 174 where the threshold port value 174 is equal to port 3260. Assume one case where the network interface driver 120 detects that the destination port identifier 172 is equal to the threshold port value 174 of 3260. In this case, the comparison indicates that the IP packet is part of an iSCSI based communication. As a result, the network interface driver 120 forwards the packet to the first function pathway 130 and to the iSCSI driver 122. Assume a second case where the network interface driver 120 detects that the destination port identifier 172 is not equal to the threshold port value 174 of 3260. In this case, the comparison indicates that the IP packet is not part of an iSCSI based communication but is part of a non-iSCSI, TCP/IP based communication. As a result, the network interface driver 120 forwards the packet to the second function pathway 132 and to the NDIS driver 124. The network interface driver 120 therefore offloads the driver selection process from the network interface device 118, thereby reducing latency in communications sessions carried between the host device 102 and the storage processor 106.

While this invention has been particularly shown and described with references to preferred embodiments thereof, it will be understood by those skilled in the art that various changes in form and details may be made therein without departing from the spirit and scope of the invention as defined by the appended claims.

For example, as indicated above, the operating system 113 running on the processing unit 112 includes first and second drivers 122, 124 such as a block-based communication driver (e.g., an iSCSI driver) and a TCP/IP, non block-based communications driver (e.g., an NDIS driver). Such description is by way of example only. In the case where the network interface device 118 is capable of carrying out three or more functions (e.g., additional functions such as mouse or keyboard based functions), the operating system 113 can establish three or more function pathways between the network interface driver 120 and the network interface device 118 for each of the functions carried out by the network interface driver.

What is claimed is:

1. A method for interfacing an operating system with a network interface device, the method comprising:
  establishing, by a processing unit of a storage processor, a driver relationship between a network interface driver of the operating system executed by the processing unit and the network interface device of the storage processor, the network interface device being configured to carry out multiple functions through the operating system of the processing unit, the storage processor configured to exchange data read/write requests between a data storage device and a host device;

associating, by the processing unit, the network interface driver with a first driver of the operating system to provide a first function pathway between the network interface device and the first driver of the operating system through the network interface driver; and associating, by the processing unit, the network interface driver with a second driver of the operating system to provide a second function pathway between the network interface device and the second driver of the operating system through the network interface driver, the first function pathway and the second function pathway allowing the network interface device to carry out the multiple functions through the operating system;

wherein establishing the driver relationship comprises:

detecting, by the processing unit, a single network function corresponding to the network interface device, the single network function representing a first network sub-function and a second network sub-function; and associating, by the processing unit, the single network function of the network interface device with the network interface driver, the network interface device being configured to carry out the first network sub-function and the second network sub-function through the operating system via the network interface driver; and further comprising:

receiving, by the processing unit of the storage processor, a communication signal from the network interface device of the storage processor, the communications signal directed from the host device to a single network address associated with the network interface device, the network interface device of the storage processor being distinct from the processing unit of the storage processor;

directing, by the processing unit, the communication signal (i) to the first function pathway when the communication signal is associated with the first network sub-function, the first network sub-function configured as Internet Small Computer System Interface (iSCSI) communication and (ii) to the second function pathway when the communication signal is associated with the second network sub-function, the second network sub-function configured as Transmission Control Protocol/Internet Protocol (TCP/IP) communication.

2. The method of claim 1, wherein:

associating the network interface driver with the first driver of the operating system comprises establishing, by the processing unit, a first device object of the network interface driver to provide the first function pathway between the network interface device and the first driver of the operating system through the network interface driver for the first network sub-function; and associating the network interface driver with the second driver of the operating system comprises establishing, by the processing unit, a second device object of the network interface driver to provide the second function pathway between the network interface device and the second driver of the operating system through the network interface driver for the second network sub-function.

3. The method of claim 1, wherein:

receiving comprises:

receiving, by the processing unit, the communication signal from the network interface device, the communications signal directed from the host device to the single network address associated with the network interface device, the communications signal configured as an Internet Protocol (IP) packet having an associated port identifier;

comparing, by the processing unit, the port identifier associated with the IP packet with a threshold port value; and directing comprises directing, by the processing unit, the communication signal (i) to the first function pathway when the port identifier associated with the IP packet matches the threshold port value and (ii) to the second function pathway when the port identifier associated with the IP packet does not match the threshold port value.

4. The method of claim 1, wherein:

associating the network interface driver with the first driver of the operating system comprises associating, by the processing unit, the network interface driver with the first driver of the operating system to provide the first function pathway between the network interface device and the first driver of the operating system through the network interface driver, the first driver configured to process a block-based communication received from the network interface device; and associating the network interface driver with the second driver of the operating system comprises associating, by the processing unit, the network interface driver with the second driver of the operating system to provide the second function pathway between the network interface device and the second driver of the operating system through the network interface driver, the second driver configured to process a non block-based communication received from the network interface device.

5. The method of claim 4, wherein associating the network interface driver with the first driver of the operating system comprises associating, by the processing unit, the network interface driver with an Internet Small Computer System Interface (iSCSI) driver of the operating system to provide the first function pathway between the network interface device and the iSCSI driver of the operating system through the network interface driver, the iSCSI driver configured to process the block-based communication received from the network interface device.

6. The method of claim 4, wherein associating the network interface driver with the second driver of the operating system comprises associating, by the processing unit, the network interface driver with a network driver of the operating system to provide the second function pathway between the network interface device and the network driver of the operating system through the network interface driver, the network driver configured to process the non block-based network communication received from the network interface device.

7. The method of claim 1, wherein establishing the driver relationship between the network interface driver and the network interface device, the network interface device being configured to carry out multiple functions through the operating system comprises establishing, by a processing unit, the driver relationship between a network interface driver of the processing unit and the network interface device, the network interface device being configured to carry out multiple functions through the operating system, the processing unit being distinct from the network interface device and the processing unit disposed in electrical communication with the network interface device via a bus.

8. The method of claim 1, the storage processor is configured to exchange data read/write requests between a data storage device and a host device as part of a storage area network (SAN).

9. A storage processor, comprising:
a network interface device configured to receive a communications signal from a host device via a network,
a bus coupled to the network interface device; and
a processing unit coupled to the bus, the processing unit configured to:
    establish, by the processing unit of the storage processor a driver relationship between a network interface driver of an operating system executed by the processing unit and the network interface device of the storage processor, the network interface device being configured to carry out multiple functions through the operating system of the processing unit, the storage processor configured to exchange data read/write requests between a data storage device and a host device,
    associate the network interface driver with a first driver of the operating system to provide a first function pathway between the network interface device and the first driver of the operating system through the network interface driver, and
    associate the network interface driver with a second driver of the operating system to provide a second function pathway between the network interface device and the second driver of the operating system through the network interface driver, the first function pathway and the second function pathway allowing the network interface device to carry out the multiple functions through the operating system;
wherein, when establishing the driver relationship, the processing unit is configured to:
    detect a single network function corresponding to the network interface device, the single network function representing a first network sub-function and a second network sub-function; and
    associate the single network function of the network interface device with the network interface driver, the network interface device being configured to carry out the first network sub-function and the second network sub-function through the operating system via the network interface driver; and
wherein the processing unit of the storage processor is further configured to:
    receive a communication signal from the network interface device of the storage processor, the communications signal directed from the host device to a single network address associated with the network interface device, the network interface device of the storage processor being distinct from the processing unit of the storage processor;
    direct the communication signal (i) to the first function pathway when the communication signal is associated with the first network sub-function, the first network sub-function configured as Internet Small Computer System Interface (iSCSI) communication and (ii) to the second function pathway when the communication signal is associated with the second network sub-function, the second network sub-function configured as Transmission Control Protocol/Internet Protocol (TCP/IP) communication.

10. The storage processor of claim 9, wherein:
when associating the network interface driver with the first driver of the operating system, the processing unit is configured to establish a first device object of the network interface driver to provide the first function pathway between the network interface device and the first driver of the operating system through the network interface driver for the first network sub-function; and
when associating the network interface driver with the second driver of the operating system, processing unit is configured to establish a second device object of the network interface driver to provide the second function pathway between the network interface device and the second driver of the operating system through the network interface driver for the second network sub-function.

11. The storage processor of claim 9, wherein:
when receiving, the processing unit is configured to:
    receive the communication signal from the network interface device, the communications signal directed from the host device to the single network address associated with the network interface device, the communications signal configured as an Internet Protocol (IP) packet having an associated port identifier, and
    compare the port identifier associated with the IP packet with a threshold port value; and
when directing, the processing unit is configured to direct the communication signal (i) to the first function pathway when the port identifier associated with the IP packet matches the threshold port value and (ii) to the second function pathway when the port identifier associated with the IP packet does not match the threshold port value.

12. The storage processor of claim 9, wherein:
when associating the network interface driver with the first driver of the operating system, the processing unit is configured to associate the network interface driver with the first driver of the operating system to provide the first function pathway between the network interface device and the first driver of the operating system through the network interface driver, the first driver configured to process a block-based communication received from the network interface device; and
when associating the network interface driver with the second driver of the operating system, the processing unit is configured to associate the network interface driver with the second driver of the operating system to provide the second function pathway between the network interface device and the second driver of the operating system through the network interface driver, the second driver configured to process a non block-based communication received from the network interface device.

13. The storage processor of claim 9, wherein, when associating the network interface driver with the first driver of the operating system, the processing unit is configured to associate the network interface driver with an Internet Small Computer System Interface (iSCSI) driver of the operating system to provide the first function pathway between the network interface device and the iSCSI driver of the operating system through the network interface driver, the iSCSI driver configured to process the block-based communication received from the network interface device.

14. The storage processor of claim 9, wherein, when associating the network interface driver with the second driver of the operating system, the processing unit is configured to associate the network interface driver with a network driver of the operating system to provide the second function pathway between the network interface device and the network driver of the operating system through the network interface driver, the network driver configured to process a non block-based network communication received from the network interface device.

15. The storage processor of claim 9, wherein when establishing the driver relationship between the network interface driver and the network interface device, the network interface device being configured to carry out multiple functions through the operating system, the processing unit is configured to establish the driver relationship between a network interface driver of the processing unit and the network interface device, the network interface device being configured to carry out multiple functions through the operating system, the processing unit being distinct from the network interface device and the processing unit disposed in electrical communication with the network interface device via a bus.

16. The storage processor of claim 9, wherein the storage processor is configured to exchange data read/write requests between a data storage device and a host device as part of a storage area network (SAN).

* * * * *